United States Patent
Wang

(10) Patent No.: US 11,069,991 B2
(45) Date of Patent: Jul. 20, 2021

(54) JOINT BETWEEN COPPER TERMINAL AND ALUMINUM WIRE, AND MAGNETIC INDUCTION WELDING METHOD THEREFOR

(71) Applicant: JILIN ZHONG YING HIGH TECHNOLOGY CO., LTD., Jilin (CN)

(72) Inventor: Chao Wang, Jilin (CN)

(73) Assignee: JILIN ZHONG YING HIGH TECHNOLOGY CO., LTD., Jilin (CN)

( * ) Notice: Subject to any disclaimer, the term of this patent is extended or adjusted under 35 U.S.C. 154(b) by 0 days.

(21) Appl. No.: 16/619,094

(22) PCT Filed: May 31, 2018

(86) PCT No.: PCT/CN2018/089207
§ 371 (c)(1),
(2) Date: Dec. 4, 2019

(87) PCT Pub. No.: WO2018/223885
PCT Pub. Date: Dec. 13, 2018

(65) Prior Publication Data
US 2020/0144738 A1 May 7, 2020

(30) Foreign Application Priority Data

Jun. 5, 2017 (CN) .......................... 201710415138.1

(51) Int. Cl.
*H01R 4/62* (2006.01)
*H01R 43/02* (2006.01)
*H01R 11/12* (2006.01)

(52) U.S. Cl.
CPC ......... *H01R 4/625* (2013.01); *H01R 43/0207* (2013.01); *H01R 11/12* (2013.01)

(58) Field of Classification Search
CPC combination set(s) only.
See application file for complete search history.

(56) References Cited

U.S. PATENT DOCUMENTS

| 1,599,259 | A | * | 9/1926 | Welch | ................... | B23K 9/282 |
| | | | | | | 219/142 |
| 1,953,891 | A | * | 4/1934 | Andrew | ................ | H01R 4/625 |
| | | | | | | 174/71 R |

(Continued)

FOREIGN PATENT DOCUMENTS

| CN | 202405074 U | * | 8/2012 |
| CN | 202405074 U | | 8/2012 |

(Continued)

OTHER PUBLICATIONS

International Search Report for PCT/CN2018/089207 dated Jul. 30, 2018, ISA/CN.

(Continued)

*Primary Examiner* — William H. Mayo, III
*Assistant Examiner* — Krystal Robinson
(74) *Attorney, Agent, or Firm* — Yue (Robert) Xu; Apex Attorneys at Law, LLP

(57) ABSTRACT

A joint of a copper terminal and an aluminum wire, the copper terminal is divided into a connecting part and a functional part connected to the connecting part, and an aluminum wire core of the aluminum wire is connected to the connecting part of the copper terminal. Preferably, the aluminum wire core extends or does not extend to the functional part. The connecting part is a component of the copper terminal that is connected with the aluminum wire, and the functional part is a fixed area of the copper terminal that is configured to connect to a power consumption device.

18 Claims, 3 Drawing Sheets

(56) References Cited

U.S. PATENT DOCUMENTS

| | | | | |
|---|---|---|---|---|
| 2,008,787 A * | 7/1935 | Febrey | B60M 5/00 | 219/107 |
| 2,222,574 A * | 11/1940 | Robertson | H01B 9/001 | 174/15.7 |
| 2,287,761 A * | 6/1942 | Frederick | H01R 11/26 | 439/804 |
| 2,367,206 A * | 1/1945 | Davis | F16L 13/141 | 29/421.2 |
| 2,379,567 A * | 7/1945 | Buchanan | H01R 4/206 | 439/868 |
| 2,446,542 A * | 8/1948 | MacInnes | H01R 4/62 | 174/94 R |
| 2,447,854 A * | 8/1948 | Gleitz | D01H 7/042 | 57/135 |
| 2,535,013 A * | 12/1950 | Freedom | H01R 4/20 | 439/877 |
| 2,629,921 A * | 2/1953 | Gray | H01B 13/0003 | 29/430 |
| 2,677,746 A * | 5/1954 | Alphonse | B23K 11/18 | 219/104 |
| 2,693,216 A * | 11/1954 | Broske | H01R 43/058 | 72/412 |
| 2,707,824 A * | 5/1955 | Bagnold | H01R 4/625 | 228/115 |
| 2,799,840 A * | 7/1957 | Barnes | H01R 4/029 | 439/880 |
| 2,816,276 A * | 12/1957 | Glenwood | H01R 4/20 | 439/866 |
| 2,883,518 A * | 4/1959 | Zabka | H01R 4/625 | 219/118 |
| 2,965,147 A * | 12/1960 | Hoffman | H01R 43/058 | 29/862 |
| 3,044,334 A * | 7/1962 | Broske | H01R 4/10 | 81/9.51 |
| 3,138,656 A * | 6/1964 | Merrell | H01R 4/625 | 174/84 R |
| 3,630,694 A * | 12/1971 | Enright | B23K 20/08 | 428/638 |
| 4,047,658 A * | 9/1977 | Frueauff, Jr. | H01R 4/625 | 228/115 |
| 4,227,103 A * | 10/1980 | Humes, Jr. | H01R 4/22 | 310/71 |
| 4,315,175 A * | 2/1982 | Hamilton | H02K 15/0056 | 310/71 |
| 4,359,599 A * | 11/1982 | Benner | B23K 9/0035 | 174/94 R |
| 4,469,395 A * | 9/1984 | Bennett | H01R 4/029 | 439/894 |
| 4,654,478 A * | 3/1987 | Ishihara | H01B 17/40 | 174/176 |
| 4,828,516 A * | 5/1989 | Shaffer | H01R 43/058 | 29/863 |
| 4,890,384 A * | 1/1990 | Shaffer | H01R 43/058 | 29/863 |
| 6,472,600 B1 * | 10/2002 | Osmani | H02G 15/1826 | 174/75 R |
| 6,538,203 B1 * | 3/2003 | Nolle | H01R 4/62 | 174/84 C |
| 9,033,751 B2 * | 5/2015 | Sato | H01R 4/206 | 439/877 |
| 9,246,239 B2 * | 1/2016 | Inoue | H01R 13/5216 | |
| 9,564,691 B2 * | 2/2017 | Yagi | H01R 4/183 | |
| 9,837,728 B2 * | 12/2017 | Kihara | H01R 4/183 | |
| 10,355,373 B2 * | 7/2019 | Iwasawa | H01R 4/188 | |
| 10,431,905 B2 * | 10/2019 | Tonoike | H01R 4/188 | |
| 2007/0134983 A1 * | 6/2007 | Hsu | H01R 43/0249 | 439/607.01 |
| 2010/0035449 A1 * | 2/2010 | Nagafuchi | H01R 9/0518 | 439/98 |
| 2011/0284286 A1 * | 11/2011 | Ra | H01R 4/70 | 174/75 R |
| 2012/0118633 A1 * | 5/2012 | Warner | H01R 4/70 | 174/84 R |
| 2012/0329342 A1 * | 12/2012 | Sato | H01R 4/184 | 439/866 |
| 2013/0199841 A1 | 8/2013 | Lehmann | | |
| 2013/0217279 A1 * | 8/2013 | Hemond | H01R 4/188 | 439/878 |
| 2014/0182127 A1 * | 7/2014 | Kovacs | H01R 9/032 | 29/860 |
| 2014/0194003 A1 * | 7/2014 | Nabeta | H01R 13/5216 | 439/604 |
| 2014/0262501 A1 * | 9/2014 | Stol | H01R 4/02 | 174/94 R |
| 2014/0378009 A1 * | 12/2014 | Yamada | H01R 4/188 | 439/865 |
| 2015/0357724 A1 * | 12/2015 | Okuno | B23K 26/206 | 439/877 |
| 2016/0148720 A1 * | 5/2016 | Kanagawa | H01B 7/0009 | 174/115 |
| 2017/0162953 A1 * | 6/2017 | Kojima | H01R 4/18 | |

FOREIGN PATENT DOCUMENTS

| | | |
|---|---|---|
| CN | 104201535 A | 12/2014 |
| CN | 206195014 U | 5/2017 |
| CN | 107123867 A | 9/2017 |
| CN | 207134495 U | 3/2018 |
| DE | 102012215720 A1 | 3/2014 |
| DE | 102014004432 A1 | 10/2014 |
| DE | 102013013151 A1 | 2/2015 |
| DE | 102014109604 A1 | 1/2016 |
| EP | 2416457 A1 | 2/2012 |
| JP | 2007012329 A | 1/2007 |
| WO | 9722426 A2 | 6/1997 |

OTHER PUBLICATIONS

European search Report dated Jan. 25, 2021 for European Application No. 18814403.4.

* cited by examiner

JOINT BETWEEN COPPER TERMINAL AND ALUMINUM WIRE, AND MAGNETIC INDUCTION WELDING METHOD THEREFOR

CROSS-REFERENCE TO RELATED APPLICATIONS

The present application is the national phase of International Application No. PCT/CN2018/089207, titled "JOINT BETWEEN COPPER TERMINAL AND ALUMINUM WIRE, AND MAGNETIC INDUCTION WELDING METHOD THEREFOR", filed on May 31, 2018, which claims the priority of the Chinese Patent Application No. 201710415138.1, the entire disclosures of which are incorporated herein by reference.

FIELD

The present application relates to the field of wire harness, and in particular to a joint of a copper terminal and an aluminum wire and a magnetic induction welding method therefor.

BACKGROUND

In the conventional connection technology of wire harness, a terminal and a wire are mainly connected by crimping, that is, a conductive core of the wire is put into a connecting part of the terminal, and the terminal and the wire are mechanically crimped together by using a terminal crimping die. However, for a combination of a copper terminal and an aluminum wire, an electrochemical reaction between the aluminum wire and the copper terminal generated with the passage of time cannot be solved by the conventional crimping method, which leads to the decrease of the mechanical performance and the electrical performance of the joint of the copper terminal and the aluminum wire. Therefore, for the connection of the joint of the copper terminal and the aluminum wire, the crimping method is difficult to be applied in industrial production.

The Chinese invention patent CN1073478C discloses a method for electromagnetically connecting or welding at least two metal parts, but the solution still has the following technical problems and technical disadvantages that cannot be solved:

(1) The above patented method is only applicable to the connection of a cylindrical terminal and a cable, and is not applicable to welding of terminals of other shapes, such as flat or arc-shaped terminals, wing-shaped open terminals, or circular closed or polygonal closed terminals. For most of the joint of the copper terminal and the aluminum wire in the field of wire harness, the terminals are non-cylindrical. Therefore, the patented method has great limitations in the manufacture of the joint of the copper terminal and the aluminum wire in the wiring harness industry.

(2) This technology cannot be directly applied to the preparation of the joint of the copper terminal and the aluminum wire. The technology is to weld two undefined categories of metals together, and the welding method described in the patent does not address the welding of copper and aluminum, or the particularity of welding of the copper terminal and the aluminum wire in the field of wire harness. A direct contact between the copper terminal and the aluminum wire will cause electrochemical corrosion in the wire harness use environment, and with the passage of time, a resistance of the joint of the copper terminal and the aluminum wire will increase, a voltage drop will increase, and a pullout force and a tearing force will decrease. Therefore, this technology cannot be directly applied to the preparation of the joint of the copper terminal and the aluminum wire.

(3) The welding method given by this technology cannot meet the industrial-grade requirements of the preparation of the joint of the copper terminal and the aluminum wire. Because the technology does not study how to control a distance between the copper terminal and the aluminum wire in magnetic induction welding, to obtain better or optimal electrical and mechanical performances of the joint of the copper terminal and the aluminum wire; the technology neither define a proportion of an area of a welding zone of the joint of the copper terminal and the aluminum wire in an area of the overlapping zone between the aluminum wire and the copper terminal. However, the above parameters are particularly important for the preparation of the joint of the copper terminal and the aluminum wire by the magnetic induction welding method. Therefore, the use of the above technology cannot meet the industrial-grade requirements of preparation of the joint of the copper terminal and the aluminum wire used in wire harness.

SUMMARY

In order to overcome the disadvantages of the conventional technology, an objective of the present application is to provide a method for connecting a copper terminal and an aluminum wire by magnetic induction welding and a joint structure obtained by the method, which can not only realize the welding between copper and aluminum and make the electrical conductivity and mechanical performance better, but also realize the connection between the terminals with different shapes of a terminal connecting portion and the aluminum wire, and further, can realize the preparation stability, and improve the preparation efficiency and quality.

In order to solve the above problems, the following technical solutions are adopted in the present application:

A joint of a copper terminal and an aluminum wire, the copper terminal is divided into a connecting part and a functional part connected to the connecting part, and an aluminum wire core of the aluminum wire is connected to the connecting part of the copper terminal. Preferably, the aluminum wire core extends or does not extend to the functional part.

The connecting part is a component of the copper terminal that is connected with the aluminum wire, and the functional part is a fixed area of the copper terminal that is configured to connect to a power consumption device.

Preferably, the joint of the copper terminal and the aluminum wire has a welding zone, an area of the welding zone is at least 1% of an area of the overlapping zone of the aluminum wire and the copper terminal. Preferably, the area of the welding zone is at least 10% of the area of the overlapping zone of the aluminum wire and the copper terminal.

It should be note that the welding zone refers to an area where the surfaces of the copper terminal and the aluminum wire are finally connected together. The overlapping zone refers to the area where the projections of the copper terminal and the aluminum wire overlap with each other.

After many experiments, the inventor found that the larger the area proportion of the welding zone in the overlapping zone of the aluminum wire and the copper terminal, the better the performances of the voltage drop and pullout force of the corresponding welded joint, and when the proportion is less than 1%, the electrical and mechanical performances of the joint apparently decrease. Therefore, the area of the welding zone of the joint is at least 1% of the area of the overlapping zone of the aluminum wire and the copper terminal. Preferably, the area of the welding zone of the joint is at least 10% of the area of the overlapping zone of the aluminum wire and the copper terminal.

Preferably, a metal spacer layer is arranged between the aluminum wire core and the copper terminal.

It should be noted that, since copper and aluminum are different elements, metal inertness of copper is greater than that of aluminum, and the electrode potential of copper and aluminum is quite different (copper is +0.337, aluminum is −1.662), when the two metals are in direct contact, aluminum will gradually lose electrons under the action of air and water, forming electrochemical reactions and resulting in corrosion of the aluminum wire and reducing the service life of wire harness, and in severe cases, sparks generated at the wire harness joint due to poor contact may cause an accident (such as burning a car). However, the smaller the electrode potential difference between the metals is, the lower the rate of the electrochemical reaction is. Therefore, in the technical solution, the inventor introduces a solution providing the metal spacer layer, that is, a metal spacer layer is added between the aluminum wire core and the connecting part of the copper terminal, and the electrode potential of the material of the metal spacer layer is between copper and aluminum, and the material of the metal spacer layer can also be gold or silver. After welding, the electrochemical reaction between the copper terminal and the aluminum wire will be reduced, thus prolonging the service life of wire harness and reducing the occurrence of accidents (such as burning a car).

Preferably, the material of the metal spacer layer is one or any combination of nickel, cadmium, zirconium, manganese, aluminum, tin, titanium, zinc, cobalt and chromium. Preferably, the material of the metal spacer layer is one or any combination of tin, nickel or zinc.

It should be noted that the electrode potential of nickel is −0.250, the electrode potential of tin is −0.136 and the electrode potential of zinc is −0.763, which are between copper and aluminum. In addition, nickel, tin and zinc are relatively easy to obtain, thus can be widely used in industrial production.

Preferably, the material of the metal spacer layer may also be one or a combination of gold or silver. Gold and silver are very stable in chemical performance and have good electrical conductivity, and thus can also be used as the metal spacer layer.

Preferably, a thickness of the metal spacer layer is 3 μm to 5000 μm. Preferably, the thickness of the metal spacer layer is 5 μm to 1000 μm.

Preferably, the metal spacer layer is independently arranged.

Preferably, the metal spacer layer is adhered to the copper terminal or the aluminum wire core by electroplating, pressure plating, chemical plating or arc spraying.

It should be noted that if the thickness of the metal spacer layer is less than 3 μm, an atomic collision will be generated between copper terminal and the aluminum wire during magnetic induction welding, the metal spacer layer can be easily destroyed by the copper terminal and the aluminum wire, which allows copper to come into contact with aluminum, which causes the metal spacer layer failing to separate the two metals. When the thickness of the metal spacer layer is greater than 5000 μm, because the conductivity of most of materials of the metal spacer layer is not as good as that of the metal such as copper and aluminum, the large thickness of the metal spacer layer will lead to an increase in the voltage drop of the welded joint. In addition, the cost increases with the increase of the amount of the metal spacer, but the performance is not improved apparently. Generally, when the metal spacer layer is fixed by electroplating, chemical plating or arc spraying, the thickness of the metal spacer layer can reach 3 μm to 1000 μm; when pressure plating or magnetic induction welding is used, the thickness of the metal spacer layer can reach 1000 μm to 5000 μm; therefore, the thickness range of the metal spacer layer in the present application is set as 3 μm to 5000 μm.

Preferably, the copper terminal is made of copper or copper alloy. Preferably, the shape of the connecting part is flat, arc-shaped, wing-shaped open, circular closed or polygonal closed.

It should be noted that the copper terminal is made of copper or copper alloy, the functional part is connected to the power consumption device, and the connecting part is connected to the aluminum wire to function to conduct the current and fix the wire harness. The connecting part of the copper terminal can be a flat, arc-shaped, wing-shaped open, circular closed structure or polygonal closed structure.

It should be noted that the conductivity of copper is better than that of aluminum, and the hardness of copper is higher than that of aluminum, so when connecting with the power consumption device, copper or copper alloy will be selected as the material of a terminal. The shape of the functional part is designed in accordance with the assembly shape with the power consumption device, and the connecting part is designed into a suitable shape according to the current, the space size of the mounting position and the requirements of the drawing force after welding.

Preferably, the aluminum wire is a solid aluminum wire or a multi-strand aluminum wire; and the aluminum wire core of the aluminum wire is made of aluminum or aluminum alloy.

Also, the following technical solutions are provided in the present application to achieve the technical objective of the present application.

A magnetic induction welding method for preparing the joint of the copper terminal and the aluminum wire as described above includes the following steps:

S1: assembling the aluminum wire core and the connecting part of the copper terminal, wherein a distance between the aluminum wire core and the connecting part of the copper terminal is 0 to 10 mm; and preferably, the distance between the aluminum wire core and the connecting part of the copper terminal is 0 to 3 mm; and S2: welding the aluminum wire core and the connecting part of the copper terminal together by magnetic induction welding so that an outer surface of the aluminum wire core is connected to a surface of the connecting part of the copper terminal.

Preferably, S1 further includes the following steps: adding an independently arranged metal spacer layer between the aluminum wire core and the connecting member of the copper terminal. Preferably, the distance between the metal spacer layer and the connecting member of the copper terminal is 0 to 10 mm. Preferably, the distance between the metal spacer layer and the connecting member of the copper terminal is 0 to 3 mm.

Preferably, S2 further includes the following steps: welding the aluminum wire core, the connecting part of the copper terminal and the metal spacer layer together by magnetic induction welding so that the outer surface of the aluminum wire core is connected to an inner surface of the metal spacer layer and an outer surface of the metal spacer layer is connected to the surface of the connecting part of the copper terminal.

It is should be noted that, the magnetic induction welding equipment used in the present application further includes a charging power source, a capacitor, a magnetic induction coil, and a jig suitable for terminals and aluminum wires.

As mentioned above, the distance between the welding end of the aluminum wire and the connecting member of the copper terminal is 0 to 10 mm; and preferably, the distance between the welding end of the aluminum wire and the connecting member of the copper terminal is 0 to 3 mm.

After many experiments, the inventor found that the welding effect is better with the above distance. If an actual distance is greater than the above distance, the distance between the welding end of the aluminum wire and the connecting member of the copper terminal is relatively far, the discharge is terminated when the aluminum wire collides with the copper terminal, and the instantaneous impact velocity is insufficient when contacting, which will result in insufficient bonding force; therefore, when the distance between the welding end of the aluminum wire and the connecting part of the copper terminal is 0 to 10 mm, it can be ensured that the aluminum wire can collide with the copper terminal under the action of an effective force and at a sufficient speed, to ensure the bonding momentum between the aluminum wire and the copper terminal. Preferably, the distance between the welding end of the aluminum wire and the connecting part of the copper terminal is 0 to 3 mm, which will make the bonding effect better.

It should be noted that the distance mentioned above refers to the distance between the respective surfaces of the portions of the copper terminal and the aluminum wire that need to be welded during electromagnetic welding. Further, if there are multiple distances, in some cases, the distances between the welding surfaces of the copper terminal and the aluminum wire are equal, and when the distance value is within the above range, it falls within the scope of protection of the present application; and in some cases, the distances between the welding surfaces of the copper terminal and the aluminum wire are not equal, and when the minimum value among all the distance values is within the above range, it falls within the scope of protection of the present application.

Preferably, the method further includes the following steps before S1: when the aluminum wire core is a multi-strand aluminum wire core, the multi-strand aluminum wire core is formed by compacting.

It should be noted that in some specific environments, the aluminum wire will be in a vibration environment, in this case, the wire core of the aluminum wire should choose a multi-strand aluminum wire core, in order to use each wire in the multi-strand aluminum wire core to disperse the stress generated by the vibration, so as to prolong the service life of the aluminum wire in the vibration environment. However, the use of this multi-strand aluminum wire core has its own structural defect, that is, there will be gaps inside the multi-strand aluminum wire core, and these gaps may cause residual water and air inside the multi-strand aluminum wire core. In order to solve this problem, a process is added before Step S1 by the inventor, that is, the multi-strand aluminum wire core is formed by compacting first, so that there will be no gap inside the aluminum wire, thus excluding the entry of water and air, and avoiding the electrochemical reaction between copper and aluminum due to the water and air which may result in corrosion between the copper terminal and the aluminum wire and reduce the service life.

Another beneficial effect of the extrusion process is that during the extrusion process, an oxide layer on the surface of the aluminum wire can be destroyed at the same time, so that there are no impurities between the copper terminal and the aluminum wire, thus making the welding effect more desirable.

Preferably, after S2 is completed, the area of the welding zone of the joint of the copper terminal and the aluminum wire is at least 1% of that the area of the overlapping zone of the aluminum wire and the copper terminal, and preferably, the area of the welding zone of the joint is at least 10% of the area of the overlapping zone of the aluminum wire and the copper terminal.

Compared with the conventional technology, the present application has the following beneficial effects.

1. The inventor of the present application effectively applies the magnetic induction welding technology to the connection of the copper terminal and the aluminum wire for the first time, and gives the industrial grade method for preparing the joint of the copper terminal and the aluminum wire through the magnetic induction welding technology for the first time.

2. Through many creative experiments, the inventor has found that controlling the distance between the aluminum wire and the connecting part of the copper terminal or the metal spacer layer and the connecting part of the copper terminal, and controlling the percentage relationship between the area of the welding zone of the joint of the copper terminal and the aluminum wire and the area of the overlapping zone of the aluminum wire and the copper terminal, will have different effects on the welding result. Based on the experimental results, the inventor gives the control range of the above parameters, and gives the method for preparing the joint of the copper terminal and aluminum wire at the industrial grade by magnetic induction welding technology for the first time. The above components collide at high speed under the action of the Lorentz force to achieve the connection at the atomic energy level, which makes the connection at the contact portion very close and seamless, and makes the connection structure more stable. According to the magnetic induction welding method for the copper terminal and the aluminum wire of the present application, because a welding portion formed by the magnetic induction welding technology is completely fitted, thereby effectively reducing the intervention of air and water, and prolonging the service life of the joint of the copper terminal and the aluminum wire. Moreover, the magnetic induction welding does not produce metal compounds in the weld, thereby ensuring the electrical and mechanical performances of the wire harness, so that the joint of the copper terminal and aluminum wire prepared by this method can meet the requirements of electrical and mechanical performances used in the wire harness industry.

3. According to the magnetic induction welding method for the copper terminal and the aluminum wire of the present application, since magnetic induction welding does not need to heat the copper terminal and the aluminum wire, the effect of saving the manufacturing cost is realized; and at the same time, because there is no need to use solder, flux and inert protective gas in the welding process, and no further treatment is required after the processing is finished, which can greatly save the cost of material and time, improve the preparation efficiency, and reduce the welding cost by 30% compared with the commonly used methods. In addition, no salt spray, dust and harmful gases are generated during the magnetic induction welding process, which can protect the environment on the one hand and prevent harms to the staff on the other hand.

4. According to the magnetic induction welding method for the copper terminal and the aluminum wire of the present application, a metal spacer layer is creatively added between the welding end of the aluminum wire and the connecting part of the copper terminal, and the electrode potential of the material of the metal spacer layer is between copper and aluminum, and the material of the metal spacer layer can also be a stable metal such as gold or silver. After welding, the electrochemical reaction between the copper terminal and the aluminum wire will be effectively delayed, thus prolonging the service life of the joint of the copper terminal and the aluminum wire, and effectively reducing the accident rate caused by the joint of the copper terminal and the aluminum wire in the wire harness field.

5. Through a series of creative experiments, the effects of different thickness of the metal spacer layer on the electrical and mechanical performances of the joint of the copper terminal and aluminum wire are studied in the present application. Based on a series of the results of the meticulous tests, the thickness range of the metal spacer layer is given, and the application requirements are standardized, which further improves the application effect of the joint of the copper terminal and aluminum wire prepared by the industrial grade method in the present application.

6. According to the magnetic induction welding method for the copper terminal and the aluminum wire of the present application, the connecting part of the copper terminal can be flat, arc-shaped, wing-shaped open, circular closed or polygonal closed structure, covering all the use shape requirements of the joint of the copper terminal and aluminum wire in the field of wire harness, and compared with the conventional technology, the use range of the joint of the copper terminal and aluminum wire in the present application is greatly enhanced.

7. According to the magnetic induction welding method for the copper terminal and the aluminum wire of the present application, when selecting the multi-strand aluminum wire core, the multi-strand aluminum wire core is first formed by extrusion, so that there is no gap inside the aluminum wire, so as to effectively reduce or avoid the electrochemical reaction between copper and aluminum due to water and air, and further improve the service life of the joint of the copper terminal and the aluminum wire.

The above description is only a summary of the technical solutions of the present application for better understanding of the technical means of the present application, which can be implemented according to the contents of the specification, and in order to make the above and other objects, features and advantages of the present application more apparent and easy to understand, preferred embodiments will be described in detail with reference to the drawings hereinafter.

DETAILED DESCRIPTION OF EMBODIMENTS

In order to further elaborate the technical means and functions adopted by the present application to achieve the intended object of the present application, the specific embodiments, structures, features and functions according to the present application are described in detail below with reference to the drawings and preferred embodiments.

First Embodiment

Figure 1:
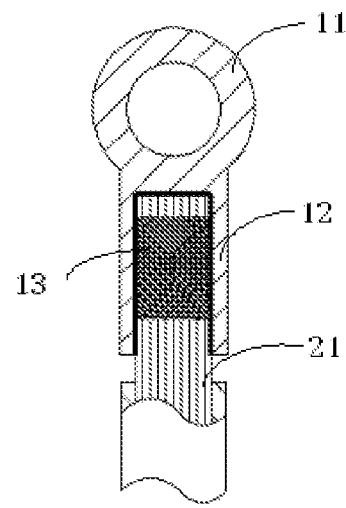
FIG. 1 is a schematic view showing the structure of a preferred embodiment of a joint of a copper terminal and an aluminum wire according to the present application.

This embodiment is one of the preferred embodiments of the joint of the copper terminal and the aluminum wire of the present application. As shown in FIG. 1, the copper terminal is divided into a connecting part 12 and a functional part 11 connected to the connecting part, and an aluminum wire core of the aluminum wire 21 is connected to the connecting part of the copper terminal. Preferably, the aluminum wire core extends or does not extend to the functional part.

Preferably, the material of the copper terminal is copper or copper alloy. Preferably, the material of the aluminum wire core of the aluminum wire is aluminum or aluminum alloy.

Figure 2:
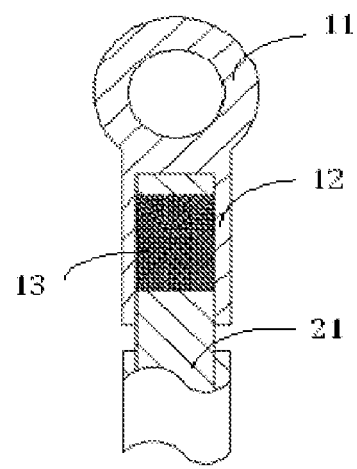
FIG. 2 is a schematic view showing the structure of another preferred embodiment of the joint of the copper terminal and the aluminum wire according to the present application.

In this embodiment, the aluminum wire is a multi-core aluminum wire, and in other embodiments, the aluminum wire can also be a solid aluminum wire, as shown in FIG. 2.

In one of the preferred embodiments, the shape of the connecting part is flat, arc-shaped, wing-shaped open, circular closed, or polygonal closed. In some specific installation layouts, copper terminals and aluminum wires are required to avoid interference positions, so the shape of the connecting part of the terminal is designed according to the special case of the cable installation, to facilitate the cable installation and avoid interference between the cable and other components.

In one of the preferred embodiments, the joint of the copper terminal and the aluminum wire has a welding zone 13, and an area of the welding zone 13 is at least 1% of the area of the overlapping zone of the aluminum wire and the copper terminal. Preferably, the area of the welding zone 13 is at least 10% of the area of the overlapping zone of the aluminum wire and the copper terminal.

In order to prove the beneficial effects of the above preferred embodiments, the inventor provides the following experiments: 120 sets of copper terminals and aluminum wires with the same material and structure are used, which are divided into 12 groups, that is, 10 sets for each group, the same magnetic induction welding machine and tooling, the same metal spacer Sn, and the same thickness of the metal spacer are used; and welding operations with the same area of the overlapping zone of the aluminum wire and the copper terminal and different areas of welding zone 13 are performed, to compare the effect of the different area proportions of the welding zone 13 in the overlapping zone of the aluminum wire and the copper terminal on the electrical and mechanical performances of the joint made by using magnetic induction welding.

It can be seen from the data in Table 1 that the larger the area proportion of the welding zone 13 in the overlapping zone of the aluminum wire and the copper terminal, the better the voltage drop performance and pullout force performance of the corresponding welded joint, and when the proportion is less than 1%, the electrical and mechanical performances of the joint are apparently decreased. Therefore, the area of the welding zone 13 of the joint is at least 1% of the area of the overlapping zone of the aluminum wire and the copper terminal. Preferably, the area of the welding zone 13 of the joint is at least 10% of the area of the overlapping zone of the aluminum wire and the copper terminal.

TABLE 1

Effect of different areas of welding zone on the voltage drop (mV) and the pullout force (N)

| NO. | Area proportion | Voltage drop (mV) | pullout force(N) |
|---|---|---|---|
| 1 | 100% | 2.9 | 2189.7 |
| 2 | 90% | 3.0 | 2057.6 |
| 3 | 80% | 3.1 | 1998.5 |
| 4 | 70% | 3.1 | 1973.6 |
| 5 | 60% | 3.2 | 1936.8 |
| 6 | 50% | 3.2 | 1922.1 |

TABLE 1-continued

Effect of different areas of welding zone on the voltage drop (mV) and the pullout force (N)

| NO. | Area proportion | Voltage drop (mV) | pullout force(N) |
|---|---|---|---|
| 7 | 40% | 3.4 | 1900.5 |
| 8 | 30% | 3.5 | 1873.7 |
| 9 | 20% | 3.6 | 1862.3 |
| 10 | 10% | 3.7 | 1830.6 |
| 11 | 1% | 4.0 | 1822.5 |
| 12 | <1% | 4.2 | 1701.2 |

In one of the preferred embodiments, a metal spacer layer is arranged between the aluminum wire core and the copper terminal.

Preferably, the material of the metal spacer layer is one or any combination of nickel, cadmium, manganese, zirconium, cobalt, aluminum, tin, titanium, zinc and chromium. Preferably, the material of the metal spacer layer is one or any combination of tin, nickel or zinc. Preferably, the material of the metal spacer layer is one or a combination of gold or silver.

Preferably, a thickness of the metal spacer layer is 3 μm to 5000 μm. Preferably, the thickness of the metal spacer layer is 5 μm to 1000 μm. In order to illustrate an implementation effect of the technical features, the inventor provides the corresponding data support, as shown in Table 2 and Table 3.

TABLE 2

Effect of different thickness of the metal spacer layer on the pullout force (N) of the connecting part

| | Thickness of the metal spacer layer | | | | | | | |
|---|---|---|---|---|---|---|---|---|
| | 1 μm | 3 μm | 5 μm | 10 μm | 50 μm | 100 μm | 300 μm | 500 μm |
| NO. | The pullout force (N) after welding | | | | | | | |
| 1 | 1992 | 2172 | 2324 | 2481 | 2371 | 2318 | 2283 | 2234 |
| 2 | 1973 | 2164 | 2351 | 2517 | 2408 | 2324 | 2284 | 2218 |
| 3 | 1976 | 2181 | 2337 | 2493 | 2384 | 2331 | 2276 | 2221 |
| 4 | 1977 | 2165 | 2328 | 2534 | 2376 | 2317 | 2291 | 2235 |
| 5 | 1984 | 2164 | 2346 | 2513 | 2406 | 2321 | 2280 | 2216 |
| 6 | 1982 | 2169 | 2339 | 2529 | 2411 | 2319 | 2274 | 2213 |
| 7 | 1975 | 2165 | 2341 | 2492 | 2408 | 2318 | 2294 | 2224 |
| 8 | 1983 | 2160 | 2349 | 2537 | 2391 | 2324 | 2283 | 2230 |
| 9 | 1982 | 2171 | 2337 | 2528 | 2386 | 2320 | 2285 | 2219 |
| 10 | 1978 | 2173 | 2330 | 2483 | 2378 | 2315 | 2279 | 2228 |
| Average value | 1980.2 | 2168.4 | 2338.2 | 2510.7 | 2391.9 | 2320.7 | 2282.9 | 2223.8 |

| | Thickness of the metal spacer layer | | | | | | |
|---|---|---|---|---|---|---|---|
| | 800 μm | 1000 μm | 2000 μm | 3000 μm | 4000 μm | 5000 μm | 6000 μm |
| NO. | The pullout force (N) after welding | | | | | | |
| 1 | 2201 | 2154 | 2094 | 2076 | 2055 | 2016 | 1975 |
| 2 | 2207 | 2150 | 2089 | 2068 | 2058 | 2014 | 1964 |
| 3 | 2202 | 2149 | 2088 | 2081 | 2059 | 2013 | 1968 |
| 4 | 2213 | 2158 | 2094 | 2074 | 2051 | 2019 | 1971 |
| 5 | 2205 | 2144 | 2091 | 2072 | 2057 | 2020 | 1972 |
| 6 | 2214 | 2146 | 2099 | 2076 | 2058 | 2017 | 1965 |
| 7 | 2198 | 2153 | 2086 | 2082 | 2049 | 2015 | 1969 |
| 8 | 2215 | 2161 | 2094 | 2068 | 2064 | 2021 | 1958 |
| 9 | 2209 | 2155 | 2097 | 2075 | 2056 | 2022 | 1967 |
| 10 | 2213 | 2158 | 2089 | 2070 | 2055 | 2018 | 1968 |
| Average value | 2207.7 | 2152.8 | 2092.1 | 2074.2 | 2056.2 | 2017.5 | 1967.7 |

TABLE 3

Effect of different thickness of the metal spacer layer on the voltage drop (mV) of the connecting part

| NO. | Thickness of the metal spacer layer | | | | | | | | | | | | | | |
|---|---|---|---|---|---|---|---|---|---|---|---|---|---|---|---|
| | 1 µm | 3 µm | 5 µm | 10 µm | 50 µm | 100 µm | 300 µm | 500 µm | 800 µm | 1000 µm | 2000 µm | 3000 µm | 4000 µm | 5000 µm | 6000 µm |
| | The voltage drop (mV) after welding | | | | | | | | | | | | | | |
| 1 | 4 | 3.5 | 3.3 | 3.1 | 3.2 | 3.4 | 3.6 | 3.6 | 3.7 | 3.8 | 4.1 | 4.1 | 4.2 | 4.2 | 5 |
| 2 | 4.3 | 3.6 | 3.3 | 3.1 | 3.2 | 3.4 | 3.5 | 3.7 | 3.5 | 4 | 4 | 4 | 4.2 | 4.4 | 5.1 |
| 3 | 4.1 | 3.4 | 3.2 | 3.1 | 3.3 | 3.4 | 3.6 | 3.6 | 3.6 | 3.9 | 4.1 | 4 | 4.1 | 4.2 | 5 |
| 4 | 4.3 | 3.5 | 3.1 | 3.3 | 3.2 | 3.5 | 3.6 | 3.7 | 3.7 | 4 | 3.8 | 4.2 | 4.3 | 4.3 | 5.2 |
| 5 | 4 | 3.4 | 3.3 | 3.1 | 3.3 | 3.5 | 3.5 | 3.5 | 3.8 | 3.9 | 4 | 4.2 | 4.3 | 4.4 | 5.1 |
| 6 | 4.1 | 3.4 | 3.3 | 3.2 | 3.1 | 3.5 | 3.5 | 3.6 | 3.8 | 3.8 | 3.8 | 4.2 | 4.2 | 4.3 | 5 |
| 7 | 4.1 | 3.4 | 3.2 | 3.1 | 3.3 | 3.4 | 3.5 | 3.7 | 3.6 | 3.8 | 3.9 | 4.1 | 4.1 | 4.3 | 5.1 |
| 8 | 4.3 | 3.5 | 3.3 | 3.2 | 3.2 | 3.4 | 3.4 | 3.7 | 3.8 | 4 | 4.1 | 4.3 | 4.1 | 4.3 | 5.2 |
| 9 | 4 | 3.4 | 3.2 | 3.2 | 3.3 | 3.5 | 3.6 | 3.6 | 3.6 | 3.8 | 4.1 | 4.1 | 4.2 | 4.4 | 5 |
| Average value | 4.13 | 3.46 | 3.24 | 3.16 | 3.23 | 3.44 | 3.53 | 3.63 | 3.68 | 3.89 | 3.99 | 4.13 | 4.19 | 4.31 | 5.08 |

It can be seen from the above table that when the thickness of the metal spacer layer is less than 3 µm or more than 5000 µm, the pullout force and voltage drop performance of the connecting part will be apparently decreased, so the thickness of the metal spacer layer is set as 3 µm to 5000 µm; and preferably, the thickness of the metal spacer layer is set as 5 µm to 1000 µm, and the welded joint has better performance.

In order to realize the arrangement and function of the metal spacer layer, the metal spacer layer is independently provided; or, the metal spacer layer is attached to the copper terminal or aluminum wire core by electroplating, pressure plating, chemical plating or arc spraying.

Second Embodiment

This embodiment is a preferred embodiment of the magnetic induction welding method for the copper terminal and the aluminum wire of the present application, which includes the following steps:

S1: the aluminum wire core is assembled with the connecting part of the copper terminal, and the distance between the aluminum wire core and the connecting part of the copper terminal is 0 to 10 mm. Preferably, the distance between the aluminum wire core and the connecting part of the copper terminal is 0 to 3 mm.

S2: the aluminum wire core and the connecting part of the copper terminal are welded together by magnetic induction welding, so that an outer surface of the aluminum wire core is connected with a surface of the connecting part of the copper terminal.

Figure 3:
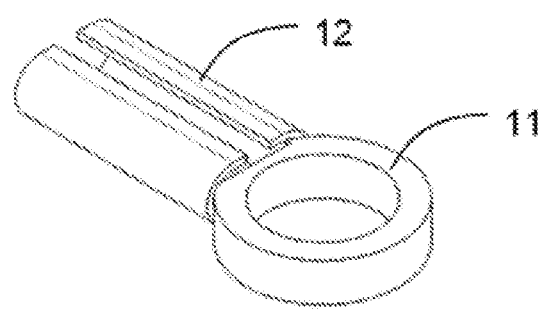
FIG. 3 is a schematic view showing the structure of the copper terminal according to the present application.
Figure 4:
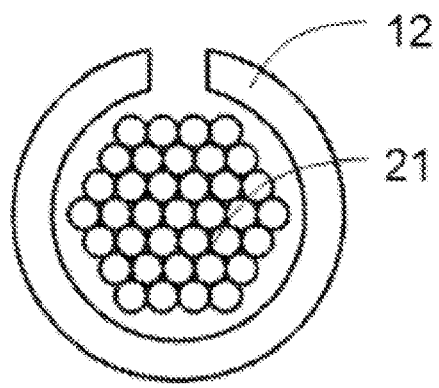
FIG. 4 is a schematic view showing the structure of a cross section of a terminal at a certain stage in the process that the copper terminal as shown in FIG. 1 is welded with the wire core of a multi-strand aluminum wire by the magnetic induction welding.
Figure 5:
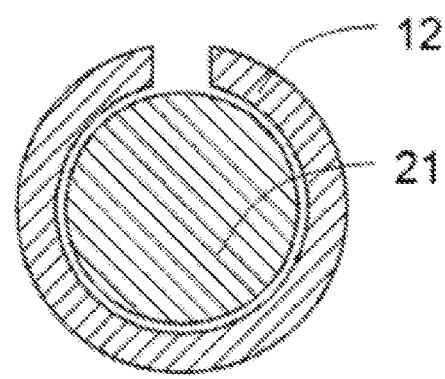
FIG. 5 is a schematic view showing the structure of the cross section of the terminal at the same stage as FIG. 4 by using a solid aluminum wire core.

Before step S1, an insulation layer of the aluminum wire is removed according to the size of the connecting part of the terminal, and then the portion of the aluminum wire with the insulation layer being peeled off and the connecting part of the copper terminal are assembled. FIG. 3 is a schematic view showing the structure of the copper terminal, and the copper terminal includes a functional part 11 and a connecting part 12 with an open structure. The connecting part is arranged to have an open structure, the processing is simple, and it is easier to use automatic equipment for production. Then, as shown in FIGS. 4 and 5, a welding end of the aluminum wire 21 after the insulation layer is peeled off is assembled with the connecting part 12 of the copper terminal, and the size of the removed insulation layer corresponds to the size of the connecting part of the copper terminal.

The distance between the aluminum wire core of the aluminum wire and the connecting part of the copper terminal is 0 to 10 mm. Preferably, the distance between the welding end of the aluminum wire and the connecting part of the copper terminal is 0 to 3 mm.

Next, the aluminum wire with the insulation layer being removed and the copper terminal are put into a work fixture, and a start button of the magnetic induction welding equipment is pressed to charge a capacitor by a charging power supply. After the set capacity of electricity is charged, the high voltage capacitance is discharged instantly, and the high voltage current passes through a magnetic induction coil to generate a high voltage electromagnetic field in the processing area, so that, under the action of Lorentz force, the conductive metals in the electromagnetic field collide with each other at a speed of 300-700 m/s in a duration of 30-100 µs, and fusion occurs at an atomic energy level, thereby realizing the connection between the terminal and the aluminum wire.

The inventor has carried out many experiments on the impacts of the distance between the aluminum wire core of the aluminum wire and the connecting part of the copper terminal on the welding effect in the welding process, and found that the different distances mentioned above can have different impacts on the welding effect. The specific experimental data are as follows:

TABLE 4

Impacts of different distances between the aluminum wire core of the aluminum wire and the connecting part of the copper terminal on the pullout force and the voltage drop of the connecting part

| NO. | Distance (mm) | pullout force (N) | Voltage drop (mV) |
|---|---|---|---|
| 1 | 0 | 2027.2 | 2.8 |
| 2 | 0.5 | 2351.4 | 2.8 |
| 3 | 1 | 2324.8 | 2.8 |
| 4 | 1.5 | 2331.5 | 2.8 |
| 5 | 2 | 2346.7 | 2.9 |
| 6 | 2.5 | 2338.6 | 2.9 |
| 7 | 3 | 2308.4 | 3.0 |
| 8 | 3.5 | 2215.8 | 3.6 |
| 9 | 4 | 2174.7 | 3.8 |
| 10 | 4.5 | 2108.6 | 3.9 |

TABLE 4-continued

Impacts of different distances between the aluminum wire core of the aluminum wire and the connecting part of the copper terminal on the pullout force and the voltage drop of the connecting part

| NO. | Distance (mm) | pullout force (N) | Voltage drop (mV) |
|---|---|---|---|
| 11 | 5 | 2002.7 | 4.0 |
| 12 | 5.5 | 1942.8 | 4.2 |
| 13 | 6 | 1927.4 | 4.5 |
| 14 | 6.5 | 1903.4 | 4.6 |
| 15 | 7 | 1857.4 | 4.7 |
| 16 | 7.5 | 1804.6 | 4.9 |
| 17 | 8 | 1778.4 | 5.1 |
| 18 | 8.5 | 1739.7 | 5.1 |
| 19 | 9 | 1718.4 | 5.2 |
| 20 | 9.5 | 1678.3 | 5.3 |
| 21 | 10 | 1644.2 | 5.4 |
| 22 | 11 | 1581.9 | 6.3 |
| 23 | 12 | 1532.7 | 6.4 |

It can be seen from the above table that the inventor found that when the distance between the welding end of the aluminum wire and the connecting part of the copper terminal is 0-10 mm, the pullout force is relatively high and the voltage drop is relatively low, and the welding effect meets the requirements of the mechanical and electrical performances of the joint of the copper terminal and the aluminum wire.

Further, when the distance between the welding end of the aluminum wire and the connecting part of the copper terminal is 0-3 mm, the performance of the pullout force and voltage drop is better, and the welding effect is better.

Figure 6A:
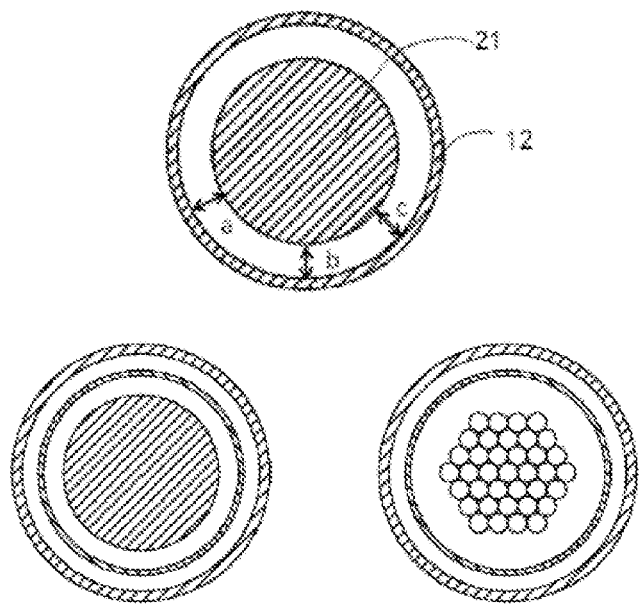
FIG. 6A and FIG. 6B are schematic views illustrating the distance between the copper terminal and the aluminum wire.
Figure 6B:
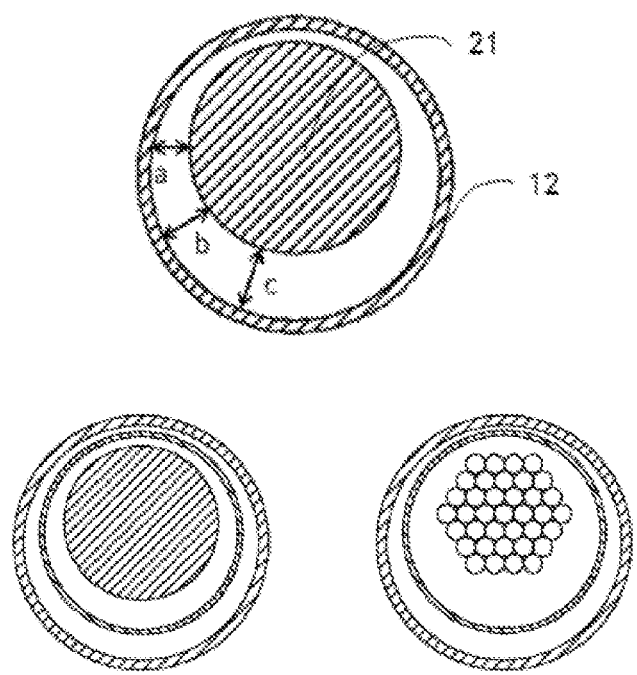

For the distances mentioned above, when the connecting part of the copper terminal is non-flat shaped, there may be multiple distance values, all of which are equal or not all equal. The two cases are further described and explained below. As shown in FIG. 6a, in a case that the aluminum wire is within the connecting part of the copper terminal and the distances between the welded surfaces are equal, that is, a=b=1 mm; at this time, if a is within the above range of 0-10 mm, it is within the scope of protection of the present application; as shown in FIG. 6b, in a case that the aluminum wire is within the connecting part of the copper terminal and the distances between the welded surfaces are not all equal, for example, in a case of a≠b≠c; at this time, a=1 mm, b=4 mm, c=12 mm, and if the minimum value of a, b and c is within the above range of 0-10 mm, it is within the scope of protection of the present application.

In one of the embodiments, the aluminum wire core 21 is a multi-strand aluminum wire core. The function of this kind of multi-strand aluminum wire core is to utilize each strand in the multi-strand aluminum wire core to disperse a stress caused by the vibration in the vibration environment, so as to prolong the service life of the aluminum wire in the vibration environment.

Preferably, the method further includes the following steps before Step S1: when the aluminum wire core is a multi-strand aluminum wire core, the multi-strand aluminum wire core is formed by extrusion.

It should be noted that the use of this multi-strand aluminum wire core has its own structural defect, that is, there will be gaps inside the multi-strand aluminum wire core, and these gaps may cause residual water and air inside the multi-strand aluminum wire core. In order to solve this problem, a process is added before Step S1 by the inventor, that is, the multi-strand aluminum wire core is formed by extrusion first, so that there will be no gap inside the aluminum wire, thus excluding the entry of water and air, and avoiding the electrochemical reaction between copper and aluminum due to the water and air which may result in corrosion between the copper terminal and the aluminum wire and reduce the service life.

Another beneficial effect of the extrusion process is that during the extrusion process, an oxide layer on the surface of the aluminum wire may be destroyed at the same time, which makes the electrical conductivity of the aluminum wire better, and make the welding effect more desirable.

In another preferred embodiment, the aluminum wire core 21 can also be solid, In a non-vibration environment, a solid aluminum wire can be used, the processing cost of the solid aluminum wire is much less than that of the multi-strand aluminum wire, and the solid aluminum wire can be welded directly with the connecting part of the copper terminal, which can avoid an unqualified situation that some core wires of the multi-strand aluminum wire core are not welded. In addition, the interior is a solid aluminum wire, and it does not have an issue that there is an oxide film on the surface of the monofilament of the multi-strand aluminum wire core, and thus the electrical conductivity is better.

Third Embodiment

This embodiment is another preferred embodiment of the magnetic induction welding method for the copper terminal and the aluminum wire of the present application and the joint structure formed thereby, and the difference between this embodiment and the above embodiment is as follows:

In this embodiment, Step S1 further includes the following steps: a metal spacer layer is added between the welding end of the aluminum wire and the connecting part of the copper terminal. Since copper and aluminum are different elements, metal inertia of copper is greater than that of aluminum, and the electrode potential of copper and aluminum is quite different (copper is +0.337, aluminum is −1.662), when the two metals are in direct contact, aluminum will gradually lose electrons under the action of air and water, forming electrochemical reactions and resulting in corrosion of the aluminum wire and reducing the service life of wire hardness, and in severe cases, sparks generated at the wire harness joint due to poor contact may cause an accident (such as burning a car). However, the smaller the electrode potential difference between the metals is, the less apparent the electrochemical reaction is. Therefore, in the technical solution, the inventor introduces a solution providing the metal spacer layer, that is, a metal spacer layer is added between the aluminum wire core and the connecting part of the copper terminal, and the electrode potential of the material of the metal spacer layer is between copper and aluminum. After welding, the electrochemical reaction between the copper terminal and the aluminum wire will be reduced, thus prolonging the service life of wire harness and reducing the occurrence of accidents (such as burning a car).

The material of the metal spacer layer is one or any combination of nickel, cadmium, manganese, zirconium, aluminum, tin, titanium, zinc, cobalt and chromium.

Preferably, the material of the metal spacer layer is one or any combination of tin, nickel or zinc.

The electrode potential of nickel is −0.250, the electrode potential of tin is −0.136, and the electrode potential of zinc is −0.763, which are between copper and aluminum. Moreover, nickel, tin and zinc are relatively easy to obtain and thus can be widely used in industrial production.

Preferably, the material of the metal spacer layer may also be one or a combination of gold or silver. Gold and silver are very stable in chemical performance and have good electrical conductivity, and thus can also be used as the metal spacer layer.

The shape of the metal spacer layer is sheet-shaped, arc-shaped, annular, wing-shaped or polygonal.

The metal spacer layer can be independently arranged, or can be attached to the copper terminal or the wire core of the aluminum wire by electroplating, pressure plating, chemical plating or arc spray plating.

As mentioned above, the metal spacer layer can be attached to the copper terminal or the aluminum wire core by electroplating, pressure plating, chemical plating or arc spraying, the specific methods are described as follows:

The electroplating method includes the following steps: 1. placing the plating metal at an anode; 2. placing the material to be plated at a cathode; 3. connecting the cathode and anode by an electrolyte solution composed of positive ions of the plating metal; 4. using the power supply to provide direct current, to oxidize the metal at the anode (losing electrons), and allowing the positive ions in the solution to be reduced into atoms at the cathode (obtaining electrons) and to be accumulated on the surface layer of the cathode.

The pressing plating method includes the following steps: 1. stacking two kinds of metals to be pressure welded; 2. applying a pressure force to make the surface to be welded fully diffused to realize the interatomic combination; 3. increasing the temperature according to different metals and pressure sources, to improve the welding effect and shortening the welding time.

The chemical plating method is a plating method in which the metal ions in the plating solution are reduced into metal and deposited on a surface of a part with the help of a suitable reducing agent without external current.

The arc spraying method includes transporting the metal spacer to an arc area and atomized, and spraying the atomized metal onto the surface of the workpiece at a high speed under the action of compressed gas, to form an arc spray coating.

In order to prove the beneficial effect of the metal spacer layer on magnetic induction welding, the inventor made a copper terminal welding piece with plating protection and a copper terminal welding piece without plating protection to compare the mechanical and electrical performances of the two samples; and after 48 hours of salt spray experiment, the mechanical and electrical performances of the samples were also compared.

It can be seen from the above table that, the inventor found that after the Ni layer is plated on the copper terminal, the pullout force is increased and the voltage drop is decreased, that is, the mechanical and electrical performances of the copper terminal with the Ni layer after welding are better than those of the copper terminal without the Ni layer.

Furthermore, the copper terminal is plated with the Ni layer, and after 48 hours of salt spray corrosion, the reduction of the performances of the pullout force and the voltage drop is apparently less than that of the joint without the Ni layer. In other words, the existence of the metal spacer is more beneficial for the manufacture of the joint of the copper terminal and aluminum wire by using magnetic induction welding, which can improve the mechanical and electrical performances of the joint of the copper terminal and the aluminum wire. The metal spacer layer is added between the aluminum wire core and the connecting part of the copper terminal. Preferably, the distance between the metal spacer layer and the connecting part of the copper terminal is 0 to 10 mm. Preferably, the distance between the metal spacer layer and the connecting part of the copper terminal is 0 to 3 mm. The following experiments are used to prove the effectiveness of the technical solution.

TABLE 6

Effect of the distance between the metal spacer layer and the connecting part of the copper terminal on the performance of the welded connecting part

| NO. | Distance (mm) | pullout force (N) | Voltage drop (mV) |
| --- | --- | --- | --- |
| 1 | 0 | 2289.4 | 2.8 |
| 2 | 0.5 | 2317.4 | 2.9 |
| 3 | 1 | 2327.6 | 3.0 |
| 4 | 1.5 | 2344.8 | 3.0 |
| 5 | 2 | 2372.7 | 3.1 |
| 6 | 2.5 | 2366.8 | 3.2 |
| 7 | 3 | 2316.7 | 3.2 |
| 8 | 3.5 | 2213.3 | 3.6 |
| 9 | 4 | 2188.7 | 3.7 |
| 10 | 4.5 | 2149.4 | 3.8 |
| 11 | 5 | 2137.6 | 4.0 |
| 12 | 5.5 | 2086.4 | 4.2 |
| 13 | 6 | 2019.5 | 4.3 |
| 14 | 6.5 | 1983.8 | 4.4 |
| 15 | 7 | 1924.6 | 4.5 |
| 16 | 7.5 | 1873.5 | 4.6 |

TABLE 5

Effect of Ni plating on the performance of the welded connecting part before and after salt spray corrosion

| | Without Ni plating layer Before salt spray corrosion | | With Ni plating layer Before salt spray corrosion | | Without Ni plating layer After 48 hours of salt spray corrosion | | With Ni plating layer After 48 hours of salt spray corrosion | |
| --- | --- | --- | --- | --- | --- | --- | --- | --- |
| No. | pullout force (N) | Voltage drop(mV) | pullout force (N) | Voltage drop(mV) | pullout force (N) | Voltage drop(mV) | pullout force (N) | Voltage drop(mV) |
| 1 | 2216 | 3.2 | 2385 | 3.1 | 1865 | 4.8 | 2247 | 3.4 |
| 2 | 2184 | 3.4 | 2354 | 2.8 | 1923 | 4.7 | 2264 | 3.3 |
| 3 | 2264 | 3.1 | 2423 | 2.9 | 1884 | 4.8 | 2185 | 3.5 |
| 4 | 2310 | 3.5 | 2371 | 2.7 | 1867 | 4.6 | 2274 | 3.5 |
| 5 | 2275 | 3.4 | 2425 | 3.2 | 1928 | 4.5 | 2294 | 3.4 |
| 6 | 2245 | 3.2 | 2328 | 3.1 | 1924 | 4.8 | 2156 | 3.2 |
| 7 | 2268 | 3.3 | 2481 | 3 | 1874 | 4.7 | 2147 | 3.5 |
| 8 | 2289 | 3.5 | 2466 | 2.8 | 1850 | 4.5 | 2189 | 3.3 |
| 9 | 2327 | 3.1 | 2451 | 2.9 | 1867 | 4.6 | 2248 | 3.4 |
| 10 | 2254 | 3.5 | 2361 | 3.1 | 1902 | 4.9 | 2234 | 3.2 |
| Average value | 2263.2 | 3.32 | 2404.5 | 2.96 | 1888.4 | 4.69 | 2223.8 | 3.37 |

TABLE 6-continued

Effect of the distance between the metal spacer layer and the connecting part of the copper terminal on the performance of the welded connecting part

| NO. | Distance (mm) | pullout force (N) | Voltage drop (mV) |
|---|---|---|---|
| 17 | 8 | 1811.9 | 4.7 |
| 18 | 8.5 | 1792.7 | 4.9 |
| 19 | 9 | 1752.9 | 5.0 |
| 20 | 9.5 | 1722.8 | 5.1 |
| 21 | 10 | 1691.7 | 5.2 |
| 22 | 11 | 1592.1 | 6.3 |
| 23 | 12 | 1557.6 | 6.5 |

It can be seen from the above table that, the inventor found that when the distance between the metal spacer layer and the connecting part of the copper terminal is 0 to 10 mm, the pullout force is relatively high, the voltage drop is relatively low, and the welding effect meets the requirements of the mechanical and electrical performances. When the distance between the metal spacer layer and the connecting part of the copper terminal is 0 to 3 mm, the above effect is more significant as shown in the table.

It is should be noted that the content required to be considered by the distance mentioned in the above paragraph can be referred to the above description of the summary of the present application, the second embodiment and FIGS. 6A and 6b, and are not repeated herein.

The remaining embodiments are the same as the above embodiments and are not repeated herein.

The above embodiments are only preferred embodiments of the present application, and cannot be used to limit the scope of protection of the present application, and any non-substantive changes and substitutes made by those skilled in the art based on the present application fall within the scope of protection of the present application.

The invention claimed is:

1. A joint of a copper terminal and an aluminum wire, wherein, the copper terminal is divided into a connecting part and a functional part connected to the connecting part, and an aluminum wire core of the aluminum wire is connected to the connecting part of the copper terminal; the aluminum wire core extends or does not extend to the functional part; the joint of the copper terminal and the aluminum wire has a welding zone, and an area of the welding zone is at east 1% of an area of an overlapping zone of the aluminum wire and the copper terminal; and a metal spacer layer is arranged between the aluminum wire core and the connecting part of the copper terminal, and a thickness of the metal spacer layer is 3 μm to 5000 μm in a radial direction of the aluminum wire core.

2. The joint of the copper terminal and the aluminum wire according to claim 1, wherein, the area of the welding zone is at least 10% of that the area of the overlapping zone of the aluminum wire and the copper terminal.

3. A magnetic induction welding method for preparing the joint of the copper terminal and the aluminum wire according to claim 2, comprising the following steps:
   S1: assembling the aluminum wire core and the connecting part of the copper terminal, wherein a distance between the aluminum wire core and the connecting part of the copper terminal is 0 to 10 mm; adding a metal spacer layer between the aluminum wire core and the connecting part of the copper terminal, wherein a thickness of the metal spacer layer is 3 μm to 5000 μm; and
   S2: welding the aluminum wire core and the connecting part of the copper terminal together by magnetic induction welding so that an outer surface of the aluminum wire core is connected to a surface of the connecting part of the copper terminal.

4. The magnetic induction welding method for preparing the joint of the copper terminal and the aluminum wire according to claim 3, wherein,
   the distance between the metal spacer layer and the connecting part of the copper terminal is 0 to 10 mm; and
   S2 further comprises the following steps: welding the aluminum wire core, the connecting part of the copper terminal and the metal spacer layer together by magnetic induction welding so that the outer surface of the aluminum wire core is connected to an inner surface of the metal spacer layer and an outer surface of the metal spacer layer is connected to the surface of the connecting part of the copper terminal.

5. The magnetic induction welding method for preparing the joint of the copper terminal and the aluminum wire according to claim 3, wherein, the method further comprises the following steps before S1: in a case that the aluminum wire core is a multi-strand aluminum wire core, the multi-strand aluminum wire core is formed by compacting.

6. The magnetic induction welding method for preparing the joint of the copper terminal and the aluminum wire according to claim 3, wherein the distance between the aluminum wire core and the connecting part of the copper terminal is 0 to 3 mm.

7. The magnetic induction welding method for preparing the joint of the copper terminal and the aluminum wire according to claim 3, wherein,
   the metal spacer layer is independently arranged; or
   the metal spacer layer is adhered to the copper terminal or the aluminum wire core by electroplating, pressure plating, chemical plating or arc spraying.

8. The joint of the copper terminal and the aluminum wire according to claim 1, wherein, the material of the metal spacer layer is one or any combination of nickel, cadmium, manganese, zirconium, cobalt, aluminum, tin, titanium, zinc, chromium, gold or silver.

9. The joint of the copper terminal and the aluminum wire according to claim 1, wherein the thickness of the metal spacer layer is 5 μm to 1000 pin.

10. The joint of the copper terminal and the aluminum wire according to claim 1, wherein, the metal spacer layer is independently arranged.

11. The joint of the copper terminal and the aluminum wire according to claim 1, wherein, the metal spacer layer is adhered to the copper terminal or the aluminum wire core by electroplating, pressure plating, chemical plating or arc spraying.

12. The joint of the copper terminal and the aluminum wire according to claim 1, wherein, the copper terminal is made of copper or copper alloy; and a shape of the connecting part is flat, arc-shaped, wing-shaped open, circular closed or polygonal closed.

13. The joint of the copper terminal and the aluminum wire according to claim 1, wherein, the aluminum wire is a solid aluminum wire or a multi-strand aluminum wire; and the aluminum wire core of the aluminum wire is made of aluminum or aluminum alloy.

14. A magnetic induction welding method for preparing the joint of the copper terminal and the aluminum wire according to claim 1, comprising the following steps:

S1: assembling the aluminum wire core and the connecting part of the copper terminal, wherein a distance between the aluminum wire core and the connecting part of the copper terminal is 0 to 10 mm;

adding a metal spacer layer between the aluminum wire core and the connecting part of the copper terminal, wherein a thickness of the metal spacer layer is 3 μm to 5000 μm; and S2: welding the aluminum wire core and the connecting part of the copper terminal together by magnetic induction welding so that an outer surface of the aluminum wire core is connected to a surface of the connecting part of the copper terminal.

15. The magnetic induction welding method for preparing the joint of the copper terminal and the aluminum wire according to claim 14, wherein, the distance between the metal spacer layer and the connecting part of the copper terminal is 0 to 10 mm; and S2 further comprises the following steps: welding the aluminum wire core, the connecting part of the copper terminal and the metal spacer layer together by magnetic induction welding so that the outer surface of the aluminum wire core is connected to an inner surface of the metal spacer layer and an outer surface of the metal spacer layer is connected to the surface of the connecting part of the copper terminal.

16. The magnetic induction welding method for preparing the joint of the copper terminal and the aluminum wire according to claim 14, wherein the distance between the aluminum wire core and the connecting part of the copper terminal is 0 to 3 mm.

17. The magnetic induction welding method for preparing the joint of the copper terminal and the aluminum wire according to claim 14, wherein, the metal spacer layer is independently arranged; or the metal spacer layer is adhered to the copper terminal or the aluminum wire core by electroplating, pressure plating, chemical plating or arc spraying.

18. The magnetic induction welding method for preparing the joint of the copper terminal and the aluminum wire according to claim 14, wherein, the method further comprises the following steps before S1: in a case that the aluminum wire core is a multi-strand aluminum wire core, the multi-strand aluminum wire core is formed by compacting.

* * * * *